United States Patent
Kolhatkar et al.

(10) Patent No.: US 8,751,399 B2
(45) Date of Patent: Jun. 10, 2014

(54) MULTI-CHANNEL DATA DRIVEN, REAL-TIME ANTI-MONEY LAUNDERING SYSTEM FOR ELECTRONIC PAYMENT CARDS

(75) Inventors: Jayashree S. Kolhatkar, Emerald Hills, CA (US); Sangita S. Fatnani, Cupertino, CA (US); Yitao Yao, Saratoga, CA (US); Kazuo Matsumoto, Santa Clara, CA (US)

(73) Assignee: Wal-mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/549,492

(22) Filed: Jul. 15, 2012

(65) Prior Publication Data

US 2013/0018796 A1 Jan. 17, 2013

Related U.S. Application Data

(60) Provisional application No. 61/508,533, filed on Jul. 15, 2011.

(51) Int. Cl.
*G06Q 40/00* (2012.01)
(52) U.S. Cl.
USPC ................................ 705/44; 705/39; 705/35
(58) Field of Classification Search
CPC ..................................................... G06Q 40/02
USPC ...................................................... 705/35, 38
See application file for complete search history.

(56) References Cited

U.S. PATENT DOCUMENTS

| 8,140,415 | B2 * | 3/2012 | Lawrence et al. ................ 705/35 |
| 8,412,605 | B2 | 4/2013 | Griffin |
| 2012/0317027 | A1 * | 12/2012 | Luk et al. .......................... 705/44 |
| 2013/0018795 | A1 | 1/2013 | Kolhatkar |

OTHER PUBLICATIONS

U.S. Appl. No. 13/549,491, filed Jul. 15, 2012, Entitled, Multi-Channel Data Driven, Real-Time Fraud Determination System for Electronic Payment Cards.

* cited by examiner

*Primary Examiner* — James A Vezeris
(74) *Attorney, Agent, or Firm* — Convergent Law Group LLP

(57) ABSTRACT

Electronic payment card money laundering detection includes receiving real-time payment card transaction data from ingress channels and an egress channels of at least one payment card system through a first API; generating transactional profiles for each of at least payment cards, the ingress channel, the egress channels, and funding sources of the payment cards; in response to receiving transaction data for a current payment card transaction, evaluating the transaction data using a predictive algorithm that compares the transaction data to the transactional profiles to calculate a probabilistic money laundering score for the current transaction; evaluating the probabilistic money laundering score and current transaction data based on a set of rules to generate a suspicious activity report that recommends whether to approve or report the current transaction; and transmitting the suspicious activity report back to the payment card system and transmitting the suspicious activity report to an identified regulatory body.

21 Claims, 10 Drawing Sheets

MULTI-CHANNEL DATA DRIVEN, REAL-TIME ANTI-MONEY LAUNDERING SYSTEM FOR ELECTRONIC PAYMENT CARDS

CROSS-REFERENCE TO RELATED APPLICATIONS

This application claims the benefit of provisional Patent Application Ser. No. 61/508,533, filed Jul. 15, 2011, incorporated herein by reference.

BACKGROUND

A stored-value card refers to monetary value stored on a card not in an externally recorded account, while with a prepaid card money is on deposit with an issuer similar to a debit card. That is, the term stored-value card means the funds and or data are physically stored on the card, while with a prepaid card the data is maintained on computers affiliated with the card issuer. Another difference between stored value (SV) cards and prepaid (PP), referred to collectively as SV/PP or electronic payment cards, is that prepaid debit cards are usually issued in the name of individual account holders, while stored value cards are usually anonymous.

Prepaid cards are categorized into two broad types—open system or open loop and closed system or closed loop. Closed system prepaid cards are typically merchant gift cards. These cards can be purchased for a fixed amount and used only at the merchant that issued the card. They generally do not require customer identification and cannot be redeemed for cash.

Semi-closed system prepaid cards are similar to closed system prepaid cards except that cardholders can redeem these cards at multiple locations within a geographic area. These cards are usually issued by a third party and not the merchant themselves. Examples include university and mall cards.

Open system prepaid cards operate on major credit card networks and can be used anywhere including on worldwide ATMs. They usually have the cardholder name. Semi-open prepaid cards are similar to open-system prepaid cards except that they do not allow for ATM withdrawals.

Open system prepaid cards are compact and offer a convenient way for physical transport of funds. Funds can be added at one location and then withdrawn from another location via ATMs in one or more countries making them popular with money launderers. Closed system cards typically have lower limits and cannot be redeemed for cash and hence may not be as popular a vehicle for money laundering.

Stored value/pre-paid cards (SV/PP Cards) allow for anonymous loading of monetary value on these cards by Money Launderers at multiple channels or entry points—namely web, mobile, agents and other point of sale mechanisms. Currently all of these channels operate independently and without knowledge of transactional activities on other channels. Current regulations do not require agents and/or banks to notify regulators—Financial Crimes Enforcement Network (FinCEN) in the US as well as regulators of other countries when the total value of multiple transactions add up $10,000 or more to a single SV/PP card. These cards can be easily and without restrictions be carried across borders.

Stored Value/Pre-Paid cards (SV/PP cards) allow for multiple channels of disbursements or exit points namely physical point of sale locations, web, ATM and mobile. Money Launderers can avoid detection by loading multiple smaller value stored value/pre-paid cards simultaneously on different channels for entry into the system. This practice also known as structuring or smurfing allows the money launderer to avoid detection by having smaller transactions that do not require regulatory oversight.

Money movement from a compromised entry source to a SV/PP card to being converted back to cash or cash equivalent is very rapid and convenient. Money Movement between countries is very easy and rapid, making recapture of laundered funds more difficult based on the plurality of regulations and jurisdictions that can apply.

The difficulty with prepaid cards is that there is usually no aggregated view available for end-to-end flow of money through the system like multiple re-loads of the same card, purchase of multiple cards, multiple transactions on the cards for layering the money and withdrawal of funds from the system using one or more channels.

Accordingly, it would be desirable to provide an improved method for system for identifying electronic payment card money laundering.

BRIEF SUMMARY

Exemplary embodiments provide methods and systems for detecting electronic payment card money laundering. Aspects of the exemplary embodiments include receiving real-time payment card transaction data from ingress channels and an egress channels of at least one payment card system through a first application programming interface (API); generating transactional profiles for each of at least payment cards, the ingress channel, the egress channels, and funding sources of the payment cards; in response to receiving transaction data for a current payment card transaction, evaluating the transaction data using a predictive algorithm that compare the transaction data to the transactional profiles to calculate a probabilistic money laundering score for the current transaction; evaluating the probabilistic money laundering score and current transaction data based on a set of rules to generate a suspicious activity report that recommends whether to approve or report the current transaction; and transmitting the suspicious activity report back to the payment card system and transmitting the suspicious activity report to an identified regulatory body.

DETAILED DESCRIPTION

Figure 1:
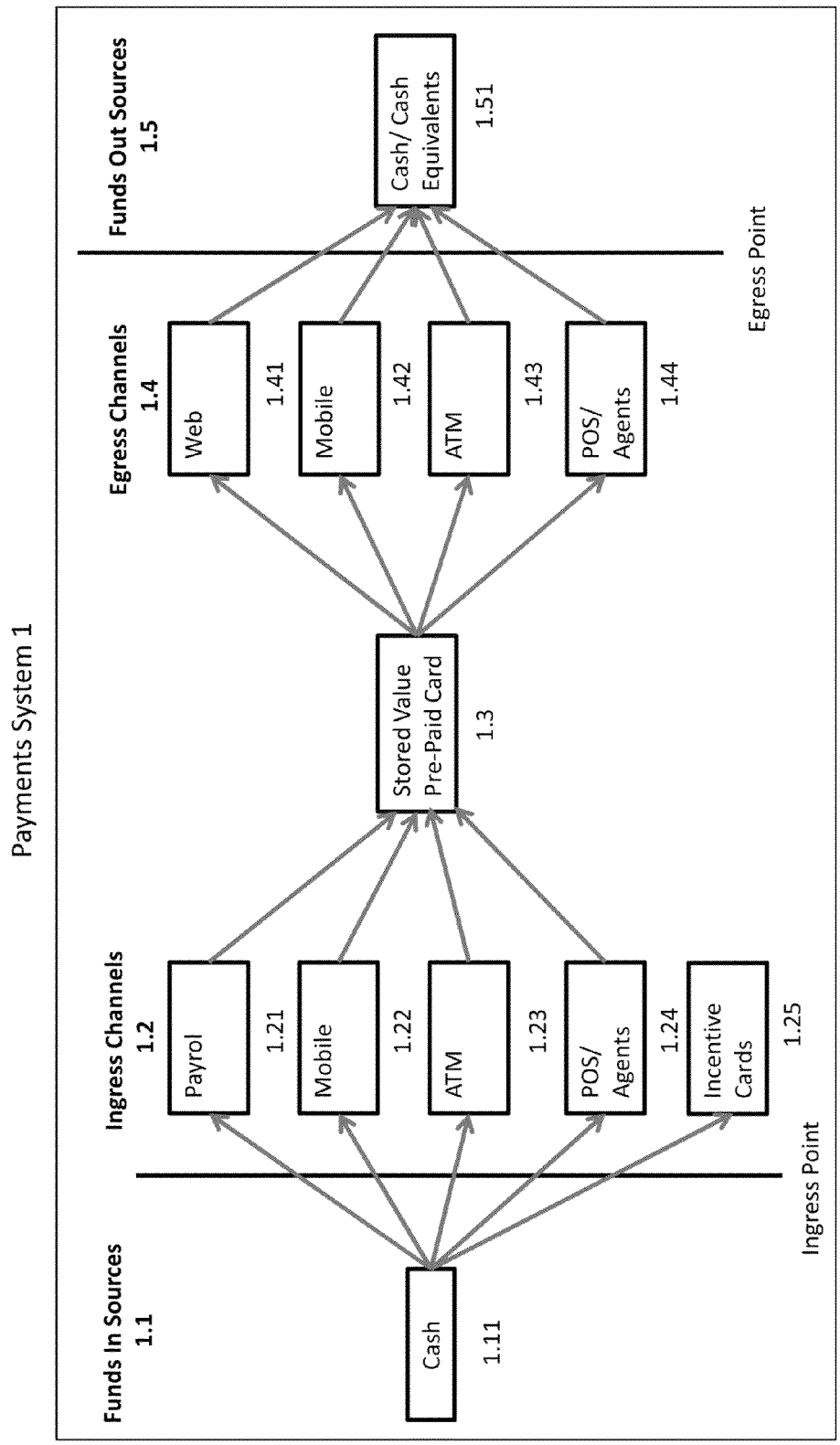
FIG. 1 shows a conventional electronic payments system and the movement of anti-money laundering funds through an electronic payment card network.

The exemplary embodiments relate to methods and systems for detecting electronic payment card money laundering. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for detecting money laundered funds through electronic payment cards across multi-channels. The exemplary embodiment will be explained in terms of an electronic payment card that is intended to include stored value cards and pre-paid cards. However, in some embodiments, electronic payment cards may also include credit and debit cards.

An exemplary system for identifying money laundering allows for real-time monitoring of funds moving into and exiting an electronic payment card across multiple channels. This system has the capacity for dynamically updating an Anti-Money Laundering monitoring (AML) system to reflect current AML trends with a) the use of real-time feedback events that notify the AML system of known money laundering behavior, and b) self-learning money laundering prediction algorithms that use this real-time feedback to modify the algorithms to account for current patterns in money laundering behavior.

This AML system has the capability of tracking fund movements to both other electronic payment cards and other exit channels. The system has the ability to use every transaction to build profiles of users, payment cards, ingress and egress channels and funding sources across multiple dimensions. The system has the ability to evaluate every transaction in a payments system in real-time using internal and external data to predict money laundering risk with a dynamic rules engine and/or predictive models to recommend a decision to approve or file a suspicious activity report (SAR) for the card holder.

The AML system relies on transactional, channel, funding source, funding exit characteristics as well as external data sources to evaluate probability of money laundering in real-time. The AML system tracks money through each point of transfer through the network and represent it as a visual graphic, allowing for enhanced money laundering monitoring and detection. The AML system has abilities to use past history of suspicious behavior in the form of probabilistic and deterministic negative files to generate a SAR when strong links are established between an incoming user/card with those on negative files. The AML system may also stop or present for review any payment card transaction as it flows through the system. The system has the ability to generate a SAR on all parties involved in the money laundering network based on individual or correlated activities of linked individuals.

FIG. 1 shows a conventional electronic payments system and the potential movement of money laundering funds through multiple channels. The payments system 1 comprises a card network that includes potential ingress and egress channels 1.2 and 1.4 to and from an electronic payment card 1.3, as well as the funds in sources 1.1 and funds out sources 1.5 for adding and extracting value from the electronic payment card 1.3. The ingress channels 1.2 include points of entry through the through payroll (example, fake companies using electronic payment cards for payroll disbursement) 1.21, mobile phones 1.22, adding funds to the payment card at an Automated Teller Machine (ATM) 1.23, at a physical point of sale or agent 1.24 (example: brick and mortar stores), or fake incentive cards 1.25. The funding sources 1.1, which can be used to introduce funds into the system, typically comprise cash 1.11.

The egress channels 1.4 may include using the electronic payment card on the internet/Web 1.41 to buy easily fenceable goods or digital goods; using mobile phones 1.42 to move money to other accounts and/or buy digital goods, using ATM $1.4^3$ to withdraw funds as cash, using the electronic payment card at a Point of Sale $1.4^4$ venues to buy fenceable goods and withdraw funds as cash. Each of the channels 1.2 and 1.4 and funding mechanism are distinctly different with different levels of difficulty in converting the laundered funds back to cash.

According to the exemplary embodiment, an anti-money laundering (AML) system is provided that brings together all incoming, outgoing and intra-network electronic payment transactions in real-time through a data transfer API. The data transfer API allows payments systems from various entities, such as banks, to transmit data into the anti-money laundering system in real-time in order to reference internal data sources, such as historical transactional profiles, transaction data including transaction specific data as well as geo-location characteristics; and external data sources, to evaluate the holistic anti-money laundering risk of the electronic payment card as well as each channel and funding mechanism. These transactions are used to build transactional profiles of the channels and funding mechanisms to evaluate usage patterns across a single SV/PP card or multiple SV/PP cards. The dynamic AML system uses these profiles along with transaction attributes, such as transaction amount, source of funds such as bank or credit cards, channel used for loading funds such as POS or ATM, velocity such as count and amount sent in the past x days, location information such as number of pre-paid cards purchased from the same zip code, same country, same IP address within x hours, external data sources and other internal data to evaluate each transaction. Risk for each channel and funding mechanism is assessed on an entity level based on prior usage patterns, geo-location, entity money laundering index, other entities linked to it etc. Depending on the use case the AML system will use risk assessment of one or many entities in identifying potential money laundering risk for each transaction.

After each transaction is completely evaluated, the anti-money laundering system sends a recommendation to approve, or generate a Suspicious Activity Report for the transaction back to the originating system through a recommendation API. Review of the transaction may require manual review of the transaction by a customer service agent and/or a call to the electronic payments system.

Figure 2:
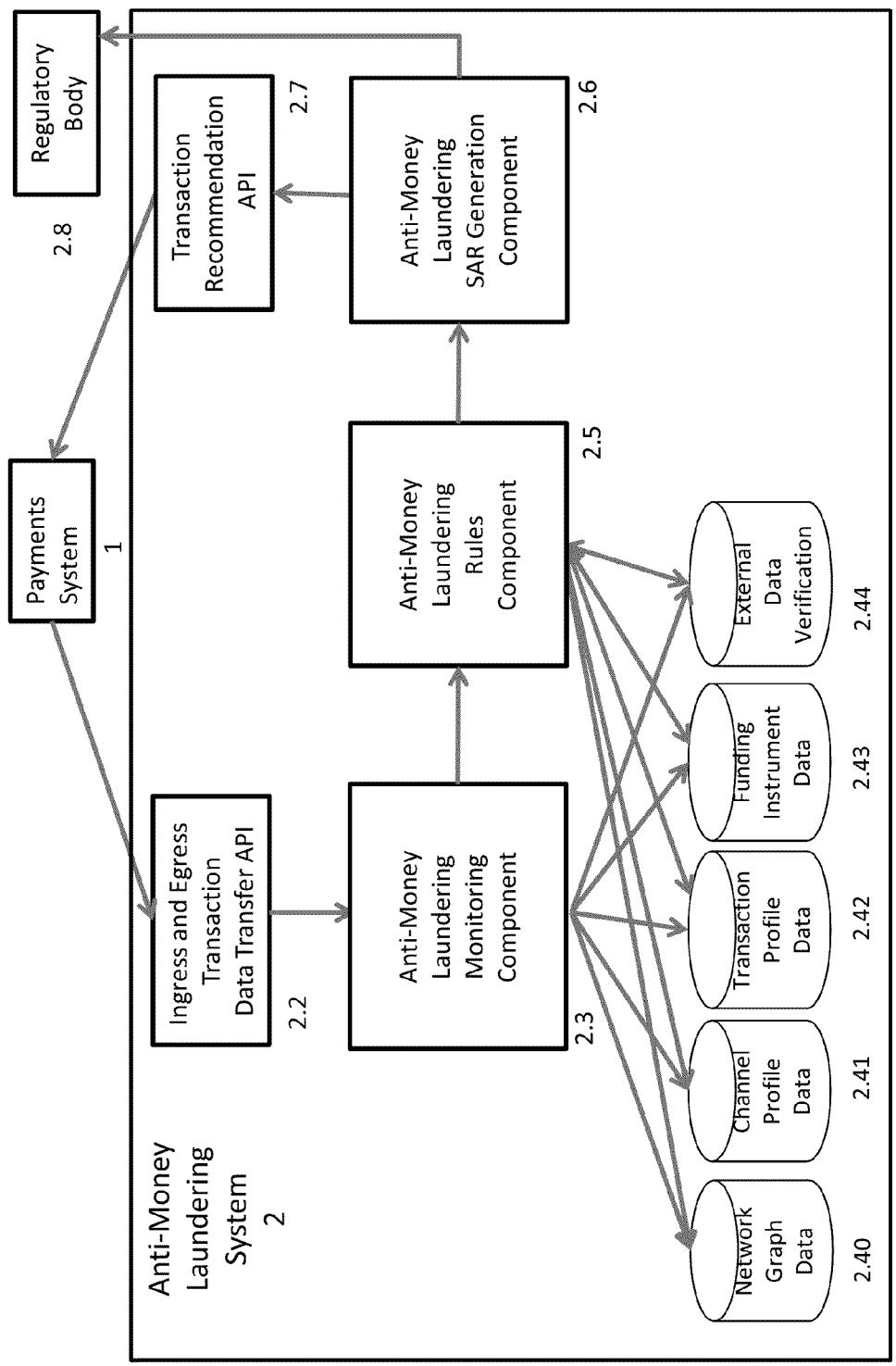
FIG. 2 is a diagram showing components of the dynamic anti-money laundering system that evaluate and identify money laundered funds entering/exiting an electronic payment card across multiple channels.

FIG. 2 is a diagram showing components of the dynamic anti-money laundering system that evaluate and identify money laundered funds entering/exiting an electronic payment card across multiple channels. In one embodiment, the anti-money laundering system 2 may include an ingress and egress transaction data transfer API 2.2, an anti-money laundering monitoring component 2.3, an anti-money laundering rules component 2.5, an anti-money laundering SAR generation component 2.6, a transaction recommendation API 2.7, and various relational and non-relational databases that may store network graph data 2.40, channel profile data 2.41, transactional profile data 2.42, funding instrument data 2.43, and external data verification database 2.44.

The anti-money laundering process may begin by receiving real-time payment card transaction data from ingress channels and egress channels from at least one payment card system 1 through the ingress and egress transaction data transfer API 2.2.

This is followed by the anti-money laundering monitoring component 2.3 generating and/or updating transactional profiles for each of at least payment cards, the ingress channel, the egress channels, funding sources of the payment cards, and users of the payment cards. The transactional profiles may be used to evaluate usage patterns, and in one embodiment are stored as the network graph data 2.40, the channel profile data 2.41, the transactional profile data 2.42, the funding instrument data 2.43, and the external data verification database 2.44.

In one embodiment, the anti-money laundering monitoring component 2.3 may generate two types of transactional profiles for each of the electronic payment card, the ingress channels, the egress channels, and the funding source. The first type of transactional profile may comprise a network graph of links between the ingress channels, the egress channels, the payment cards, any users of the payment cards, and geo-location identities associated with the payment cards. The network graph may be stored as the network graph data 2.40.

The second type of transactional profile may comprise a series of transactional usage patterns at different time intervals for each of the payment cards, the ingress channels, the egress channels, and the funding sources. The transactional usage patterns may be stored as the channel profile data 2.41, the transactional profile data 2.42, and the funding instrument data 2.43. In addition to this data, the anti-money laundering management system 2.3 may invoking API calls to populate the external data verification database 2.44 with data retrieved from external sources that are used to verify geo-location (e.g., internet protocol (IP) addresses), phone numbers, and addresses associated with the current transaction.

In one embodiment, the anti-money laundering monitoring component 2.3 may comprise three main modules, namely, a network graph module, a profile module, and external data retrieval module (not shown). The network graph module may be configured to create the network graph data 2.40. The profile module may be responsible for creating the transactional profiles, including the channel profile data 2.41, transactional profile data 2.42 and the funding instrument data 2.43. External data retrieval module may be responsible for making the API calls necessary for retrieving the external data used to populate the external verification database 2.44. All three modules may be configured to facilitate fast traversal through the data, allow for new data elements to be added without schema changes and accommodate sparse data structures. The three modules may be meta-data driven and may have an embedded rules language to build and update relationships and profiles.

After the appropriate transactional profiles are created for the transaction data received from the payments system 1 for a current payment card transaction, the transaction data is processed by the anti-money laundering rules component 2.5. In response to receiving transaction data for the current payment card transaction, the anti-money laundering rules component 2.5 uses a set of predictive algorithms that compare the transaction data to the transactional profiles to calculate a probabilistic money laundering score for the current transaction.

In one embodiment, the anti-money laundering rules component 2.5 has the capability to pull data from the network graph data 2.40, the channel profile data 2.41, the transactional profile data 2.42, the funding instrument data 2.43 and from the external data verification API 2.44 to compute predictive probabilistic scores.

The anti-money laundering rules component 2.5 may be configured to utilize multiple predictive algorithms in general as well as within a given use case. The predictive algorithms may include, but are not limited to, regression, decision trees, neural networks, random forest, and genetic algorithms. The result of the anti-money laundering rules component 2.5 is a probabilistic score assigned to a transaction and/or to the parties involved in the transaction. The anti-money laundering rules component 2.5 is designed to be self-learning with the ability to incorporate new anti-money laundering behaviors into the predictive algorithms.

Next, the anti-money laundering SAR generation component 2.6 evaluates the probabilistic money laundering score and the current transaction data based on a set of rules and generates a suspicious activity report recommending to approve or report the current transaction. The anti-money laundering SAR generation component 2.6 then transmits the SAR back to the payment card system 1 via the recommendation APIs 2.7. The anti-money laundering SAR generation component 2.6 also identifies an appropriate regulatory body and notifies the regulatory body of the SAR.

The anti-money laundering SAR generation component 2.6 may utilize a rules language to build and deploy cutoff strategies further refining the probabilistic score to minimize false positive and false negative incidences. The anti-money laundering SAR generation component 2.6, similar to the anti-money laundering scoring system 2.5, has access to all other systems and data within the larger anti-money laundering system 2. The anti-money laundering SAR generation component 2.6 may have self discovery capabilities that allow it to discover and use new data elements without schema and code changes due to the meta-data driven nature of the system. The anti-money laundering SAR generation component 2.6 may include the probabilistic score in the SAR along with a recommendation to approve or report that is sent to the payments system 1 through the transactions recommendation API 2.7. The SAR can be embedded as part of a response back to an incoming transaction request received over the data transfer API, or can be posted asynchronously to a pre-defined location.

One aspect of the exemplary embodiment is the ability of the anti-money laundering system 2 to communicate with one or more payment systems 1. In one embodiment, the ingress/egress transaction data transfer API 2.2 contains two components, a fixed component that allows for uniformity of sending data across multiple channels, and a flexible component that allows each channel to send data that is unique and relevant to that channel. The ingress/egress transaction data transfer API 2.2 may use JavaScript Object Notation (JSON) to define the payload.

In one embodiment, the ingress/egress transaction data transfer API 2.2 can be one of three versions: 1) Fire and Forget—used when a sending entity does not expect a response but is merely sending the message to advise the anti-money laundering system 2 of a change in status of the payment card; 2) Synchronous—used when a sending entity is expecting a recommendation as part of the response back to the sending entity; and 3) Asynchronous—used when a sending entity is expecting a recommendation but not as part of the response back. An asynchronous response is posted back to the sending entity's pre-designated location.

Although the ingress and egress transaction data transfer API 2.2, the anti-money laundering monitoring component 2.3, the anti-money laundering rules component 2.5, the anti-money laundering SAR generation component 2.6, and the transaction recommendation API 2.7 are shown as separate components, the functionality of each may be combined into a lesser or greater number of modules/components.

In addition, it should be understood the anti-money laundering system may be implemented as a web service that communicates with one or multiple payments systems 1 over the internet through respective servers (not shown). Further, the anti-money laundering monitoring component 2.3, the anti-money laundering rules component 2.5, and the anti-money laundering SAR generation component 2.6 may run on one or more servers or on any type of computers that have memory and processors.

The servers and/or computers comprising the anti-money laundering system 2 may include hardware components of typical computing devices (not shown), including one or more processors, input devices (e.g., keyboard, pointing device, microphone for voice commands, buttons, touchscreen, etc.), and output devices (e.g., a display device, speakers, and the like). The servers and computers may include computer-readable media, e.g., memory and storage devices (e.g., flash memory, hard drive, optical disk drive, magnetic disk drive, and the like) containing computer instructions that implement the functionality disclosed when executed by the processor(s). The server and/or the computers may further include wired or wireless network communication interfaces for communication.

Figure 3:
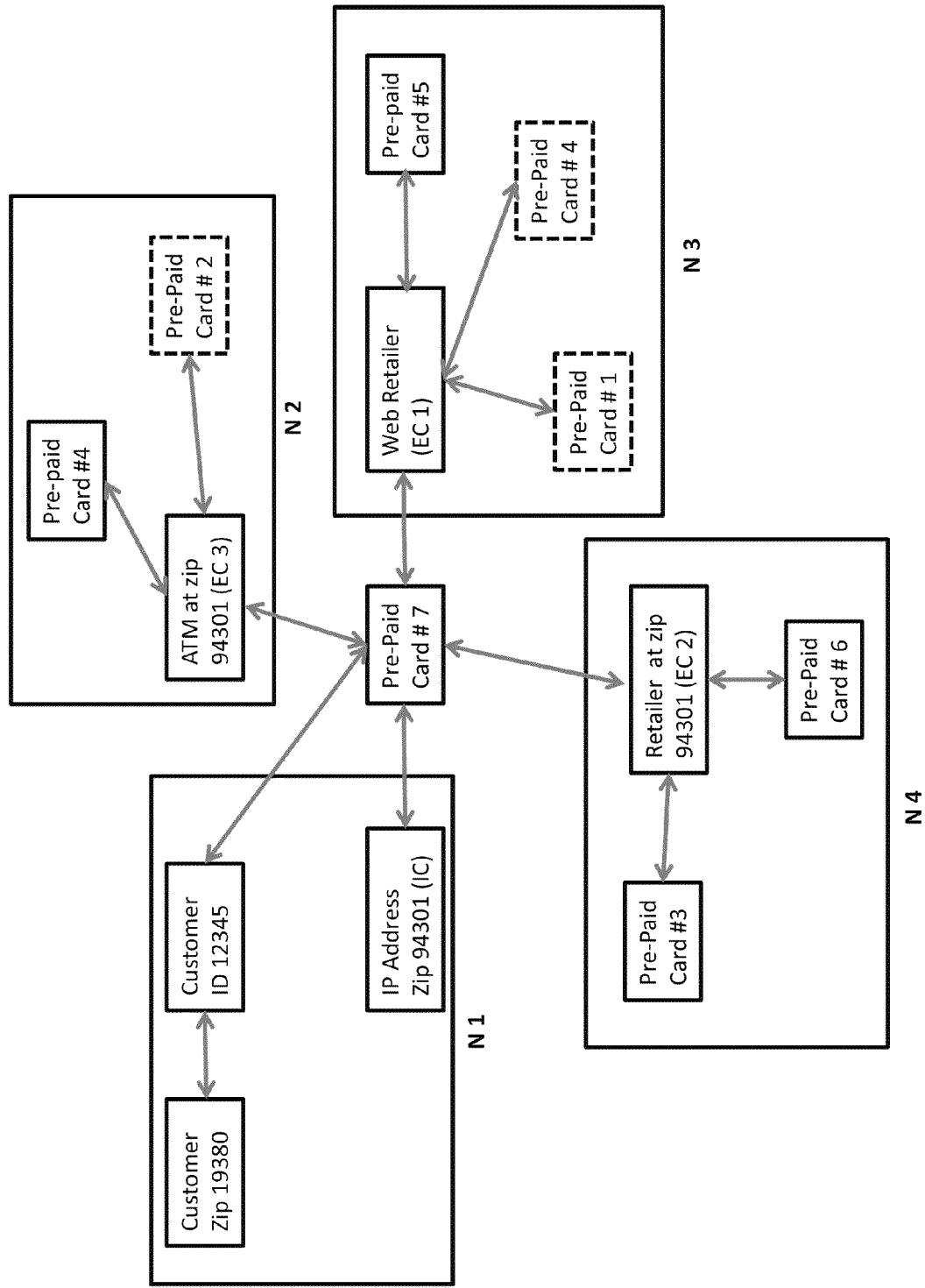
FIG. 3 describes processing of the anti-money laundering rules component to use networks and links between the ingress/egress channels, funding source and other electronic payment cards to calculate probabilistic negative scores for a card transaction in one embodiment.

FIG. 3 describes processing of the anti-money laundering rules component 2.5 to use networks and links between the ingress/egress channels, funding source and other electronic payment cards to calculate probabilistic negative scores for a card transaction in one embodiment. The anti-money laundering rules component 2.5 leverages surrounding networks around first order links to calculate probabilistic negative scores. For example, network N1 depicts the customer and ingress network around pre-paid card 7. Network N1 has geo-location discrepancies between the customer geo-location and the ingress channel geo-location because the customer using prepaid card 7 has a ZIP code of 19380, while the customer's IP address indicates the ZIP code is 94301. Additionally, networks N2 and N3 that are linked to pre-paid card 7 through the egress channels of a web retailer (EC 1) and an ATM (EC 3), have a high rate of known "bad" prepaid cards (prepaid cards 1, 4 and 2). Using these statistics about networks 1, 2 and 3, the anti-money laundering rules component 2.5 may assign a high probability of pre-paid card 7 being used for money laundering.

Figure 4:
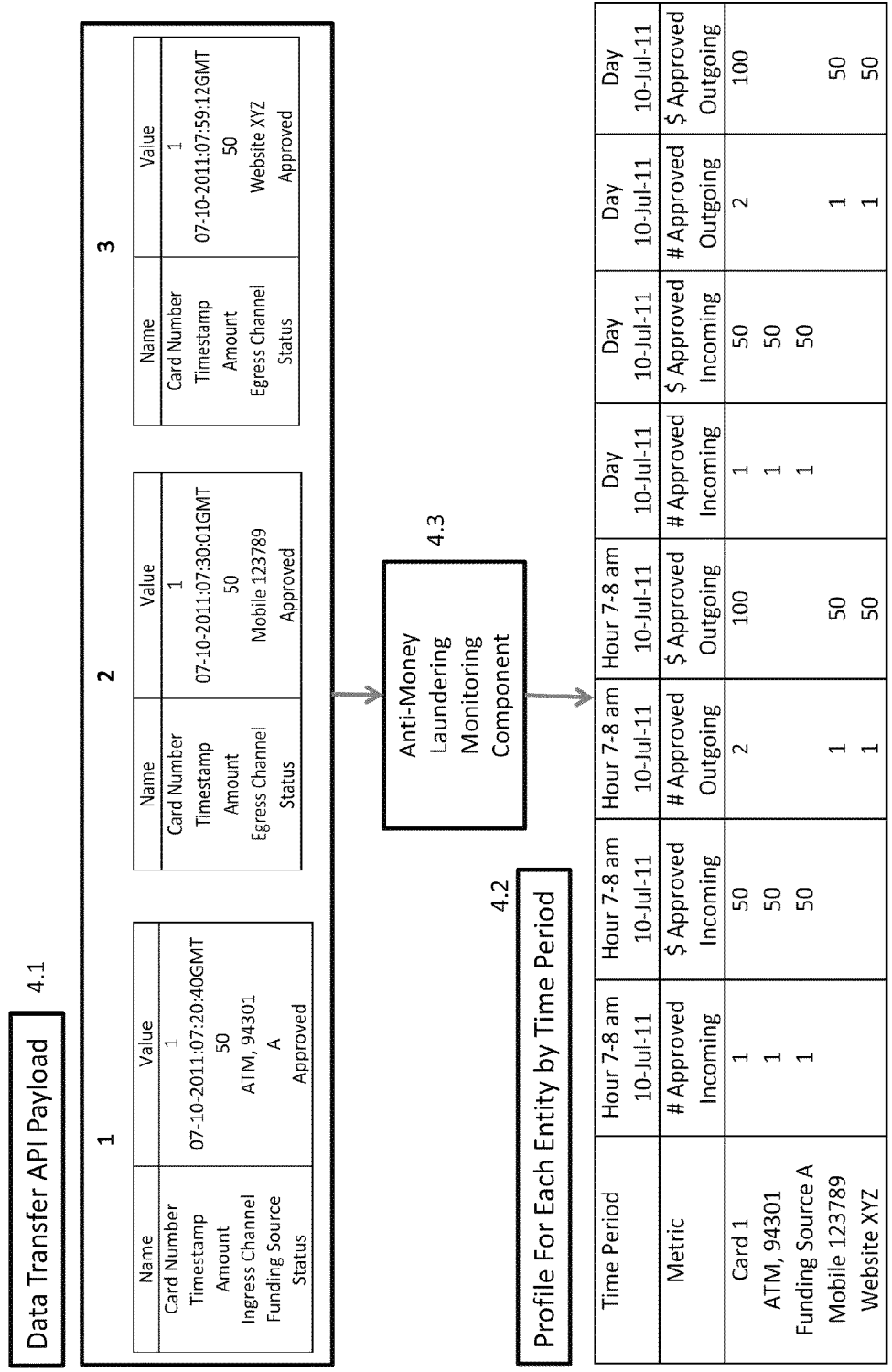
FIG. 4 is a diagram illustrating a process the profile module of the anti-money laundering monitoring component performs to create and store transactional usage patterns.

FIG. 4 is a diagram illustrating a process the profile module of the anti-money laundering monitoring component 2.3 performs to create and store transactional usage patterns. The transaction data comes into the anti-money laundering system 2 through the data transfer API 2.2 in a data transfer API payload 4.1. In this example, the data transfer API payload 4.1 includes three transactions for payment card 1. The first transaction shown is a funding transaction and the other two transactions are buying transactions. All transactions indicate relevant ingress or egress channels and/or the funding source. Once received by the anti-money laundering monitoring component 2.3, the profile module stores the transactions in a profile for each entity by time period 4.2 as shown.

The funds moving on to an electronic payment card may happen simultaneously across multiple channels and multiple funding sources. The Funds In anti-money laundering system process looks at all ingress channels simultaneously and evaluates money laundering risk on both individual electronic payment cards as well as the individual ingress channel.

The funds moving on to a payment card may happen via multiple re-loads on the same card in same or different geographies. The anti-money laundering rules component 2.5 evaluate the velocity and dollar amounts of re-loads along with the channels and the geographies used for re-loads to evaluate the money laundering risk.

A number of payment cards can be purchased from an address, zip code, geographic area or IP address by money launderers. If the velocity of cards purchased from the same address, zip code, geographic area or IP address exceeds some pre-determined thresholds then these cards will be flagged by the anti-money laundering rules component 2.5. Suspicious activity reports may then be generated depending on users, links, funding channel etc. associated with these cards or if there is subsequent suspicious activity on these cards.

Figure 5:
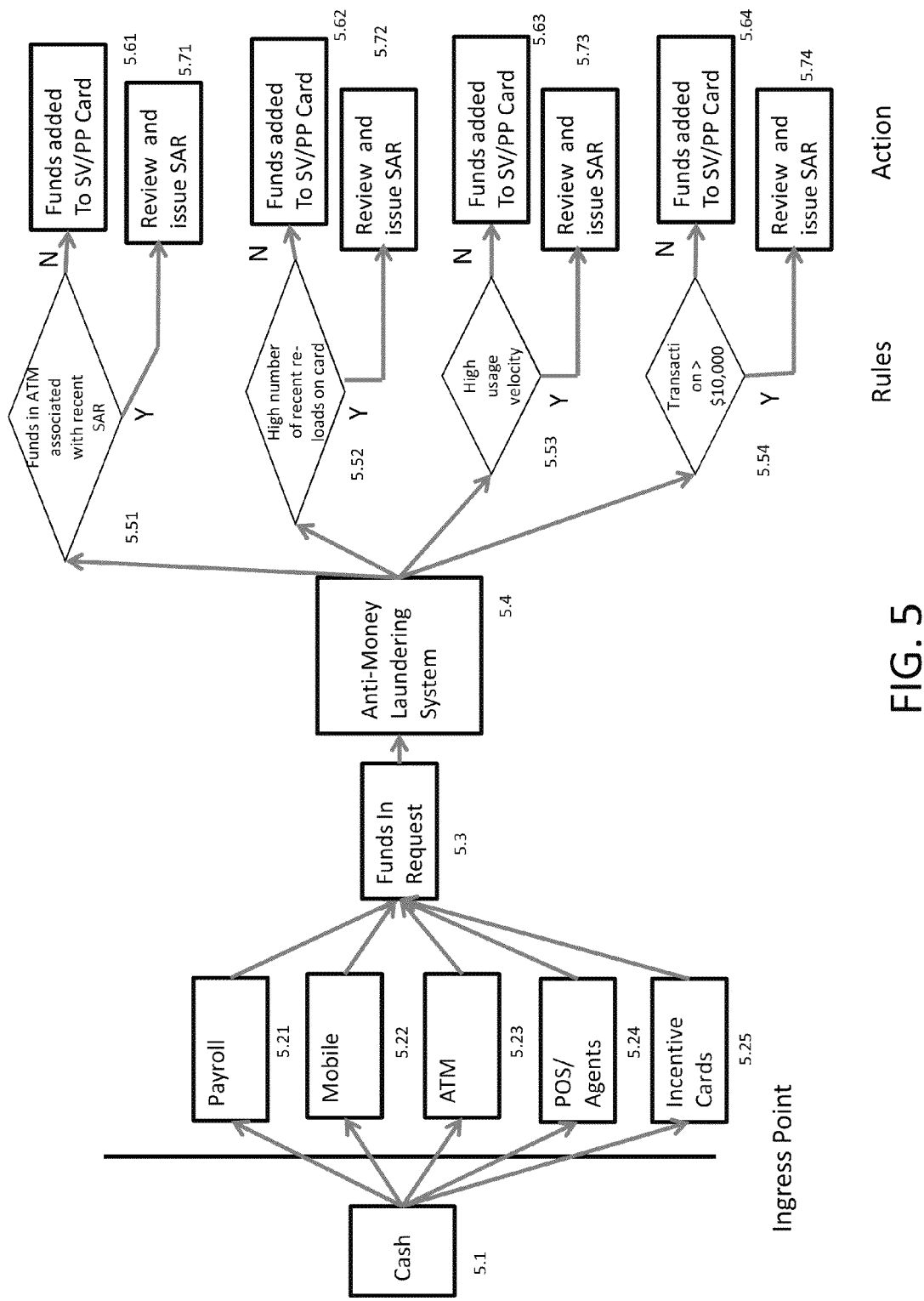
FIG. 5 shows a process for evaluating money laundering funds entering an electronic payment card across multiple channels.

FIG. 5 shows a process for evaluating money laundering funds entering an electronic payment card across multiple channels. The process for evaluating anti-money laundering begins when the anti-money laundering system 5.4 receives a request for moving funds in 5.3 from the payment system 1. The funding source is usually cash 5.1 and may come in from any of the incoming ingress channels 5.21—5.25. The anti-money laundering system 5.4 in real time evaluates transaction data from the request and updates or creates profiles for the specified user, the ingress channel and the payment card, as described above. The transaction is passed along to the anti-money laundering rules component 2.5, which assigns the transaction a probabilistic scored using one or many self-learning predictive algorithms in blocks 5.51-5.54. The result of this process is that the transaction is tagged with a probabilistic scoring indicating a level of potential money laundering risk.

The tagged transaction moves to the anti-money laundering SAR generation component 2.6, which evaluates the score, the user, the channel and payment card based on a set of heuristic rules. If the score is below a predetermined threshold for the attributes of the transaction, the anti-money laundering SAR generation component 2.6 determines which relevant regulatory body needs to be notified and automatically issues the SAR to that regulatory body in blocks 5.71-5.74. In one embodiment, the SAR may also be transmitted to the payment system 1 through the recommendation API transports.

According to the exemplary embodiment, this funds in process looks at all ingress points simultaneously as well as all funding sources funding in to a single point, allowing for capturing money laundering at both an electronic payment card level as well as the individual ingress point.

Figure 6:
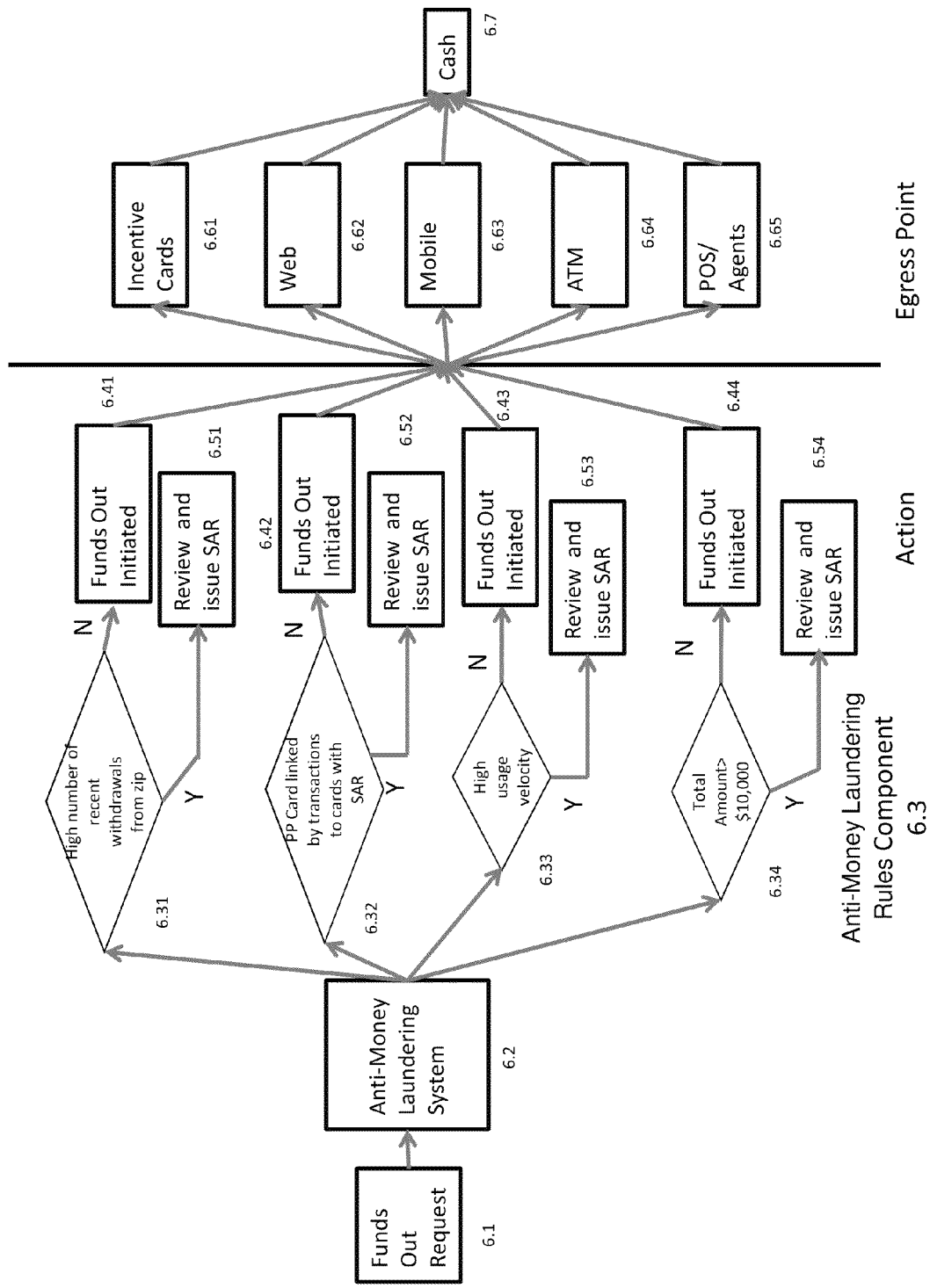
FIG. 6 shows a process for evaluating money laundering funds exiting from an electronic payment card to multiple channels.

FIG. 6 shows a process for evaluating money laundering funds exiting from an electronic payment card to multiple channels. The process for evaluating anti-money laundering begins when the payments system 1 sends a funds out request 6.1 to the anti-money laundering system 6.2. Outgoing channels 6.61-6.65 are the egress points. The anti-money laundering system 6.2 in real time evaluates the transaction and updates or creates profiles for the user, the card, and the egress channel. The transaction is passed along to the anti-money laundering rules component 6.3, which assigns the transaction a probabilistic scored using one or many self-learning predictive algorithms in blocks 6.31-6.34. The result of this process is that the transaction is tagged with a probabilistic scoring indicating a level of potential money laundering risk.

The tagged transaction moves to the anti-money laundering SAR generation component 2.6, which evaluates the score, the user, the channel and payment card based on a set of heuristic rules. If the score is below a predetermined threshold for the attributes of the transaction, the anti-money laundering SAR generation component 2.6 determines which relevant regulatory body needs to be notified and automatically issues the SAR to that regulatory body in blocks 6.51-6.54. In one embodiment, the SAR may also be transmitted to the payment system 1 through the recommendation API transports. The non-tagged transactions allow money to be moved to the exit channel 6.41-6.44.

The funds out process evaluates at all egress points simultaneously as well as all electronic payment cards egressing out to a single point, allowing for capturing money laundering at both an electronic payment card level as well as the individual egress point.

Figure 7:
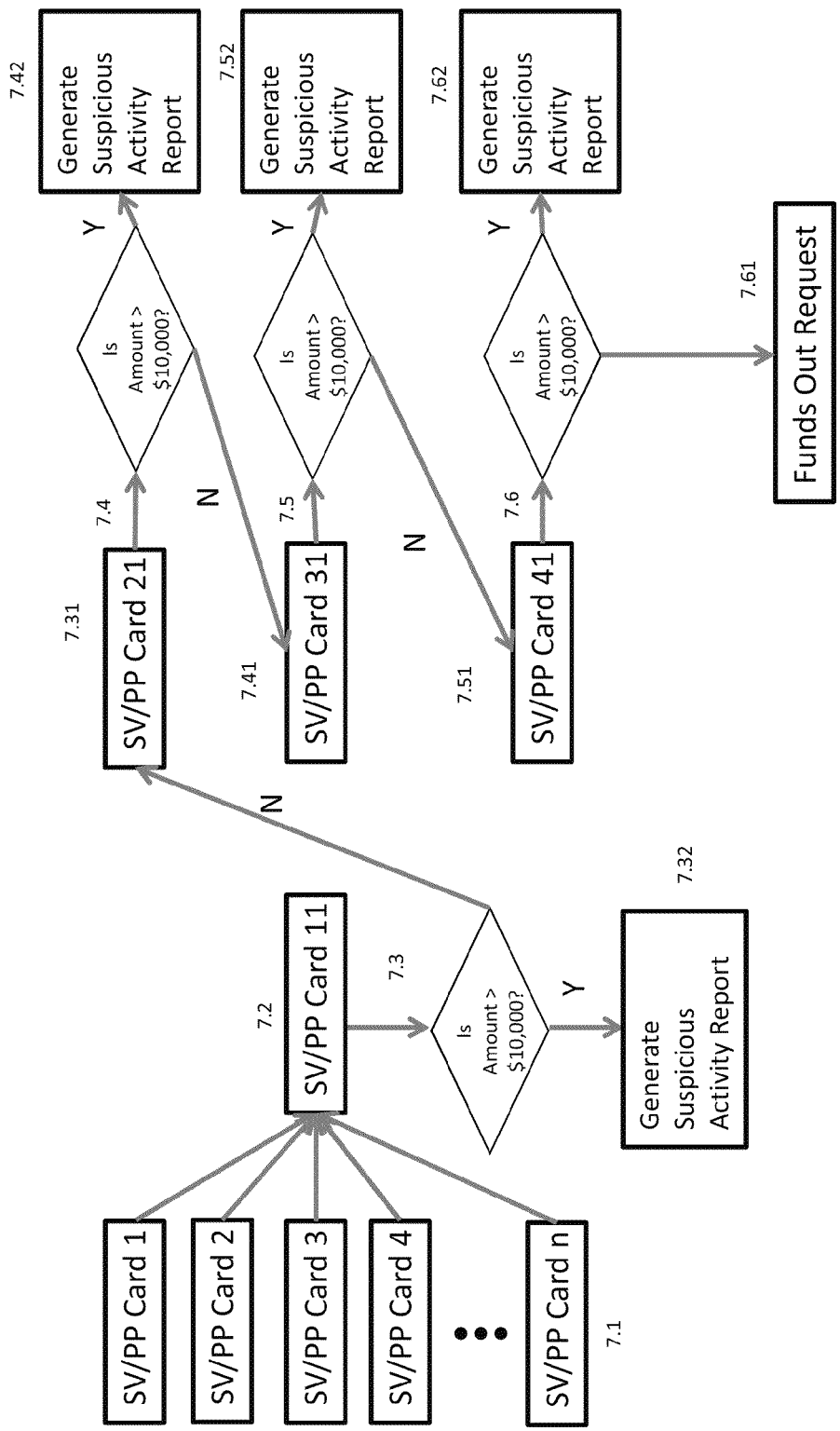
FIG. 7 shows a process for evaluating money laundering funds moving across multiple electronic payment cards.

FIG. 7 shows a process for evaluating money laundering funds moving across multiple electronic payment cards. Funds can be moved from one payment card to another electronic payment card, thus obfuscating the movement of money within the payments card system before exiting the anti-money laundering funds out of the system. The process starts with the anti-money laundering system 2 receiving from the payments system 2 a funds transfer request 7.2 on behalf of payment card no 11. The anti-money laundering monitoring component in real time evaluates the transaction and updates or creates profiles for the user, the channel and the funding Source. The transaction is passed along to the anti-money laundering rules component 7.3 where the transaction is scored using one or many predictive algorithms. The result is a probabilistic score assigned to the transaction. The transaction and the score are passed to the anti-money laundering SAR generation component, which based on a set of heuristic rules determines if the score passes a predetermined threshold for the attributes of the transaction in block 7.32. If so the SAR is issued, and if not, other related fund transfer requests are evaluated the same way in blocks 7.31-7.62 This shows how the funds are moved from one card to another and yet again to another card to escape detection. Card 11 sends funds to card 21, who sends them on to card 31 who in turn sends them to card 41 which then exits the funds out of the system. If no SAR is generated for any of the transactions, the Funds out request proceeds in block 7.61.

The process looks at all relevant databases for transactional, relational and other profile data for the source electronic payment card as well as the relevant data for the destination electronic payment card within the AML monitoring system and provides an a tag to denote to the system to file a SAR to the relevant regulatory agency 5.42-5.62 The system examines every single movement through the electronic payment card network, captures the movement by creating links between the various endpoints, thus allowing for detection of Money laundering activities and networks at each point of movement.

Figure 8:
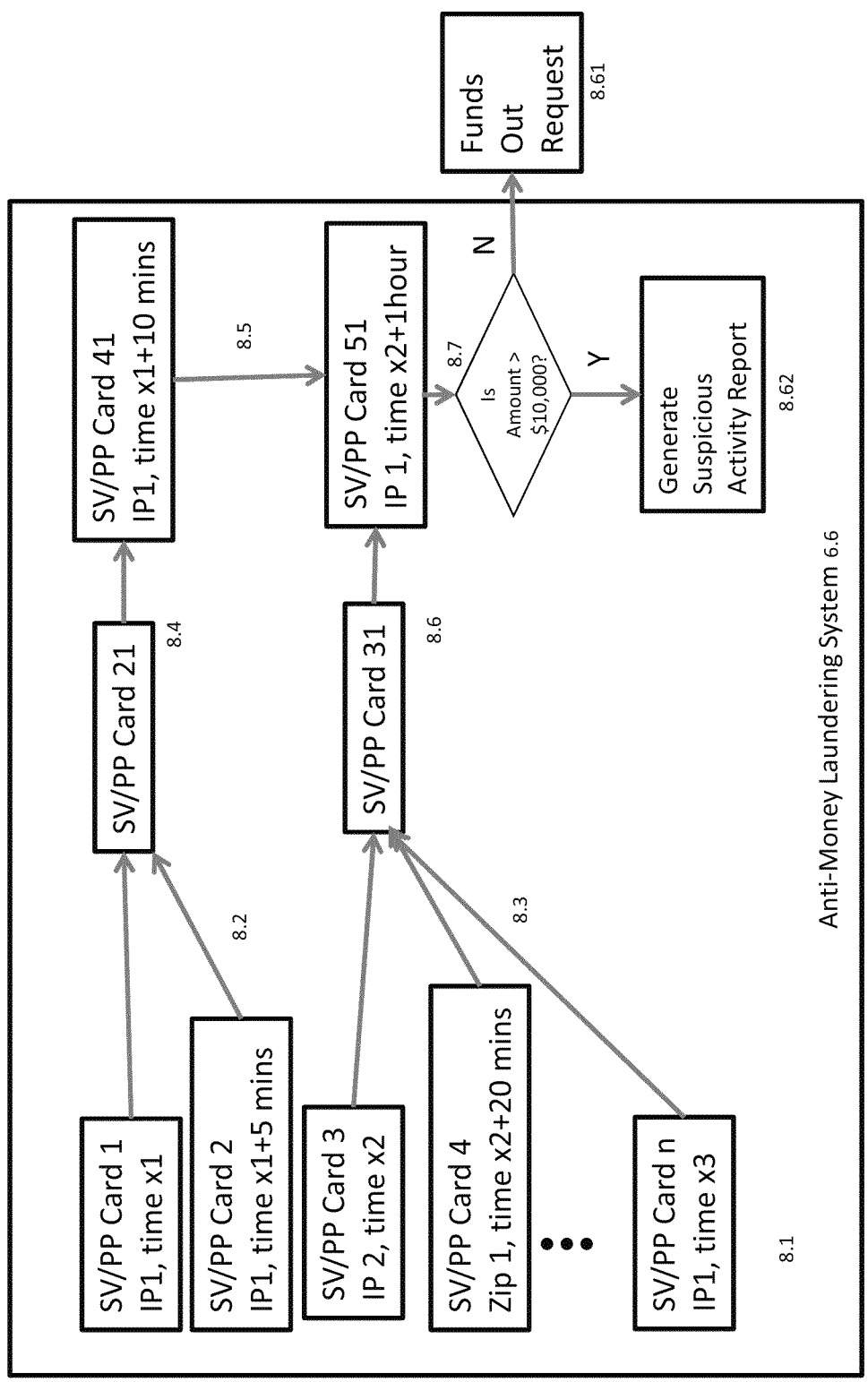
FIG. 8 describes the process for monitoring movement of laundered funds across multiple electronic payment cards by using location as an example to create links between SV/PP cards and creating suspicious activity reports.

FIG. 8 describes the process for monitoring movement of laundered funds across multiple electronic payment cards by using location as an example to create links between SV/PP cards and creating suspicious activity reports. Funds can be moved from one electronic payment card to one or more electronic payment cards thus obfuscating the movement of money within the electronic payment card network before exiting the laundered funds out of the network. In the example here, the anti-money laundering system 8.6 uses location based on IP addresses to link all the SV/PP cards. Card1 and Card2 use IP1 within 5 minutes of each other to move funds to Card21 via lines 8.2. Card3, Card4 to Cardn from different locations move funds to Card31 via lines 8.3. Card21 subsequently moves funds to Card41 via lines 8.4. Both Card31 and Card41 8.5 move funds to Card51 via lines 8.6 and 8.5. Card 51 subsequently tries to exit money from the system using IP1. All Cards 1 to n, Card21, Card31, Card41 and Card51 are now linked via IP. The suspicious activity is detected by the anti-money laundering system by the rules component in block 8.7, which provides a tag to denote to the system to file a SAR to the relevant regulatory agency in block 8.62. The system examines every single movement through the electronic payment card network, captures the movement by creating links between the various endpoints, thus allowing for detection of money laundering activities and networks at each point of movement.

Figure 9:
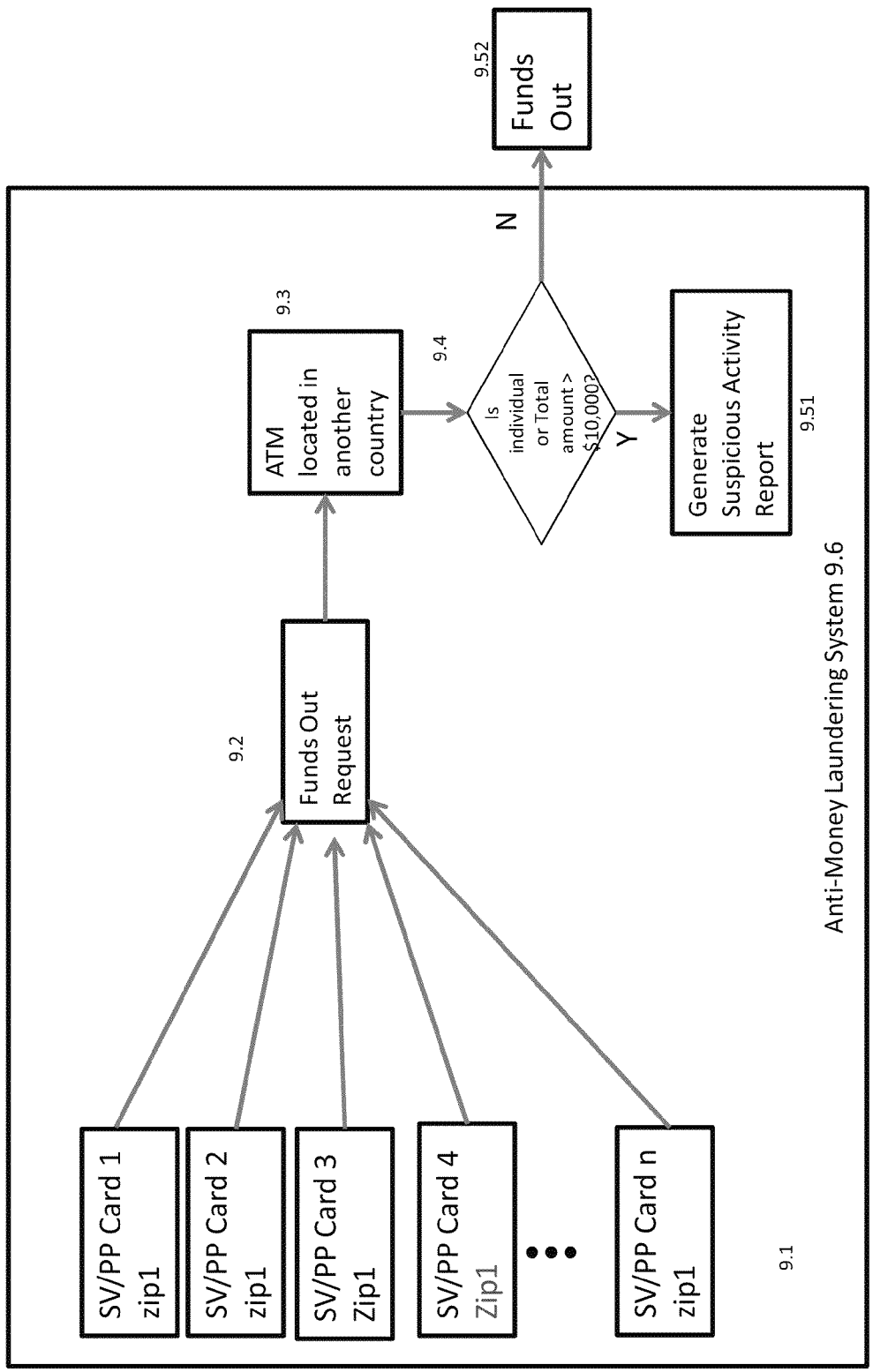
FIG. 9 describes the process for monitoring movement of laundered funds across multiple electronic payment cards by using location as an example to create links between SV/PP cards and creating suspicious activity reports.

FIG. 9 describes another example of monitoring movement of laundered funds across multiple electronic payment cards by using location as an example to create links between SV/PP cards and creating Suspicious Activity Reports. This example considers the situation where multiple cards are purchased from the same location and money is withdrawn from the cards via an ATM 9.3 at different location. As is the previous example, geographic location may be used to link all the SV/PP cards. Money is loaded on to Card1 through Cardn within the same zip code, zip1, as shown at 9.1. The anti-money laundering system 9.6 calculates the velocity of card purchases by geography and tags the transactions if the velocity is over a threshold in block 9.4. Subsequent activity on this group of cards is monitored. In this example since all these cards exit money out using the same ATM 9.3 located in another country, the anti-money laundering system 9.6 triggers the generation of a SAR in block 9.51.

Figure 10:
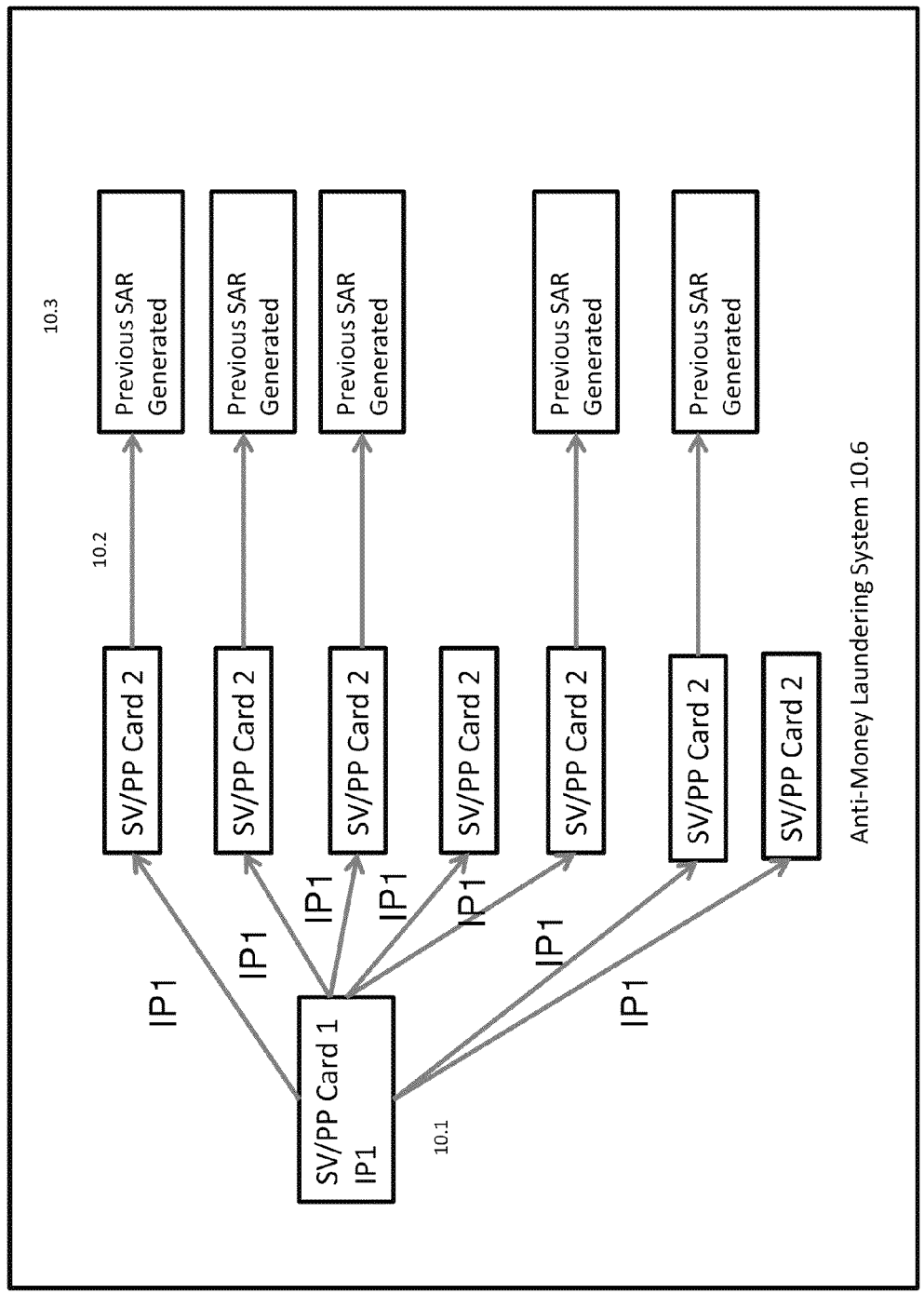
FIG. 10 describes another example of monitoring movement of laundered funds across multiple electronic payment cards by using location as an example to create links between SV/PP cards and creating Suspicious Activity Reports.

FIG. 10 is a diagram illustrating an example of flagging potential incoming suspicious activity by linking cards with a previous history of suspicious activity via IP address. Card1 is loaded from IP address IP1, and will be linked by the anti-money laundering system 10.6 to all other cards associated with this IP address via lines 10.1. In this example, assume that 5 of the 7 cards associated with IP address IP1 were tagged as suspicious in the past via lines 10.2 and resulted in the generations of SARs 10.3. Since the SAR rate for IP1 was 71%, which is high, SAR generation is triggered for Card 1, or Card 1 is flagged for further monitoring.

A method and system for detecting electronic payment card amoney laundering has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A computer-implemented method for detecting electronic payment card money laundering, comprising:
   receiving, by at least one software component executing on at least one processor, real-time payment card transaction data from ingress channels and channels of at least one payment card system through a first application programming interface (API);
   generating, by the at least one software component, at least two types of transactional profiles for each of at least: payment cards, the ingress channel, the egress channels, and funding sources of the payment cards,
      wherein a first type of transactional profile comprises a network graph of links between the ingress channels, the egress channels, the payment cards, any users of the payment cards, and geo-location identities associated with the payment cards; and
      wherein a second type of transactional profile comprises a series of transactional usage patterns at different time intervals of each of the payment cards, the ingress channels, the egress channels, and the funding sources;
   in response the at least one software component to receiving transaction data for a current payment card transaction, evaluating the transaction data using a predictive algorithm that compares the transaction data to the transactional profiles to calculate a probabilistic money laundering score for the current transaction;
   evaluating the probabilistic money laundering score and the current transaction data based on a set of rules to generate a suspicious activity report that recommends whether to approve or report the current transaction; and
   transmitting the suspicious activity report back to the payment card system and transmitting the suspicious activity report to an identified regulatory body.

2. The method of claim 1 wherein generating transactional profiles further comprises populating an external data verification database with data retrieved from external sources and using the data for verification of geo-location, phone numbers, and addresses associated with the current payment card transaction.

3. The method of claim 1 further comprising calculating the probabilistic money laundering score using multiple predictive algorithms comprising any combination of regression, decision trees, neural networks, random forest, and genetic algorithms.

4. The method of claim 1 wherein evaluating the probabilistic money laundering score further comprises utilizing a rules language to build and deploy cutoff strategies for creating appropriate recommendations.

5. The method of claim 1 wherein transmitting the suspicious activity report back to the payment card system further comprises one of embedding the recommendation as part of a response back to an incoming transaction request and posting the recommendation asynchronously to a pre-defined location.

6. The method of claim 1 wherein the method is performed by an anti-money laundering system that communicates with one or more card payments systems using the first and second APIs.

7. The method of claim 1 wherein the first API comprises a fixed component that allows for uniformity of sending data across multiple channels and a flexible component that allows each of the channels to send data that is unique to that channel.

8. An executable software product stored on a non-transitory computer-readable medium containing program instructions for detecting electronic payment card money laundering, the program instructions for:
   receiving, by the program instructions executing on at least one processor, real-time payment card transaction data from ingress channels and egress channels of at least one payment card system through a first application programming interface (API);
   generating at least two types of transactional profiles for each of at least: payment cards, the ingress channel, the egress channels, and funding sources of the payment cards,
      wherein a first type of transactional profile comprises a network graph of links between the ingress channels, the egress channels, the payment cards, any users of the payment cards, and geo-location identities associated with the payment cards; and
      wherein a second type of transactional profile comprises a series of transactional usage patterns at different time intervals of each of the payment cards, the ingress channels, the egress channels, and the funding sources;
   in response to receiving transaction data for a current payment card transaction, evaluating the transaction data using a predictive algorithm that compare the transaction data to the transactional profiles to calculate a probabilistic money laundering score for the current transaction;
   evaluating the probabilistic money laundering score and the current transaction data based on a set of rules to generate a suspicious activity report that recommends whether to approve or report the current transaction; and
   transmitting the suspicious activity report back to the payment card system and transmitting the suspicious activity report to an identified regulatory body.

9. The software product of claim 8 wherein generating transactional profiles further comprises software instructions for populating an external data verification database with data retrieved from external sources and using the data for verification of geo-location, phone numbers, and addresses associated with the current payment card transaction.

10. The software product of claim 8 further comprising software instructions for calculating the probabilistic money laundering score using multiple predictive algorithms comprising any combination of regression, decision trees, neural networks, random forest, and genetic algorithms.

11. The software product of claim 8 wherein evaluating the probabilistic money laundering score further comprises software instructions for utilizing a rules language to build and deploy cutoff strategies for creating appropriate recommendations.

12. The software product of claim 8 wherein transmitting the suspicious activity report back to the payment card system further comprises software instructions for one of embedding the recommendation as part of a response back to an incoming transaction request and posting the recommendation asynchronously to a pre-defined location.

13. The software product of claim 8 wherein the software instructions comprise an anti-money laundering system that communicates with one or more card payments systems using the first and second APIs.

14. The software product of claim 8 wherein the first API comprises a fixed component that allows for uniformity of sending data across multiple channels and a flexible component that allows each of the channels to send data that is unique to that channel.

15. A system, comprising:
a memory;
at least one processor coupled to the memory;
a first application programming interface (API) executed by the processor that is configured to receive real-time payment card transaction data from ingress channels and egress channels of at least one payment card system;
an anti-money laundering monitoring component executed by the processor that is configured to generate transactional profiles for each of at least—payment cards, the ingress channel, the egress channels, and funding sources of the payment cards,
wherein a first type of transactional profile include a first profile comprises a network graph of links between the ingress channels, the egress channels, the payment cards, any users of the payment cards, and geo-location identities associated with the payment cards; and
wherein a second type of transactional profile comprises a series of transactional usage patterns at different time intervals of each of the payment cards, the ingress channels, the egress channels, and the funding sources;
an anti-money laundering rules component executed by the processor that is configured to receive transaction data for a current payment card transaction, and evaluate the transaction data using a predictive algorithm that compare the transaction data to the transactional profiles to calculate a probabilistic money laundering score for the current transaction;
an anti-money laundering SAR generation component executed by the processor that is configured to evaluate the probabilistic money laundering score and current transaction data based on a set of rules to generate a suspicious activity report that recommends whether to approve or report the current transaction; and
a second API executed by the processor that is configured to transmit the recommendation back to the payment card system.

16. The system of claim 15 wherein the anti-money laundering monitoring component further populates an external data verification database with data retrieved from external sources and using the data for verification of geo-location, phone numbers, and addresses associated with the current payment card transaction.

17. The system of claim 15 wherein the anti-money laundering rules component calculates the probabilistic money laundering score using multiple predictive algorithms comprising any combination of regression, decision trees, neural networks, random forest, and genetic algorithms.

18. The system of claim 15 wherein the anti-money laundering rules component evaluates the probabilistic money laundering score utilizing a rules language to build and deploy cutoff strategies for creating appropriate recommendations.

19. The system of claim 15 wherein the recommendation is transmitted back to the payment card system by one of embedding the recommendation as part of a response back to an incoming transaction request and posting the recommendation asynchronously to a pre-defined location.

20. The system of claim 15 wherein the system comprises an anti-money laundering system that communicates with one or more card payments systems using the first and second APIs.

21. The system of claim 15 wherein the first API comprises a fixed component that allows for uniformity of sending data across multiple channels and a flexible component that allows each of the channels to send data that is unique to that channel.

* * * * *